United States Patent Office

3,376,297
Patented Apr. 2, 1968

3,376,297
BIS-PYRRYLVINYLPYRIDINIUM SALTS
Arthur P. Phillips, Tuckahoe, and Robert B. Burrows, Ardsley, N.Y., assignors to Burroughs Wellcome & Co. (U.S.A.) Inc., Tuckahoe, N.Y., a corporation of New York
No Drawing. Filed Oct. 12, 1964, Ser. No. 403,347
Claims priority, application Great Britain, Aug. 7, 1964, 32,275/64
7 Claims. (Cl. 260—240.1)

ABSTRACT OF THE DISCLOSURE

This invention relates to compounds which have anthelmintic activity, particularly against whipworms such as *Trichuris vulpis* in the dog, as well as activity against other parasitic nematode worms. The compounds of this invention are of the formula

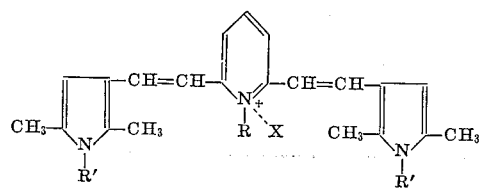

wherein R is selected from the class consisting of lower alkyl and benzyl and wherein R' is selected from the class consisting of alkyl having from 1 to 10 carbon atoms, phenethyl, phenyl, parachlorophenyl and $(CH_3)_2NCH_2CH_2$, and wherein X is a therapeutically acceptable anion.

---

The present invention relates to chemical compounds which have anthelmintic activity.

The compounds are of Formula I

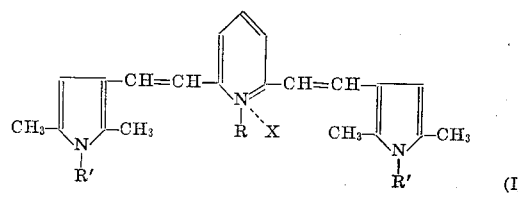

(I)

wherein R is an alkyl group of 1 to 5 carbon atoms or a benzyl group and R' is an alkyl group of 1 to 10 carbon atoms or an aryl or aralkyl group and each of these R' groups may be optionally substituted with one or more hydroxy, amino or substituted amino groups, or halogen atoms and X is an anion such as a halide, alkylsulphate or tosylate. As the therapeutically active moieties of the compounds depicted above are the cations, the nature of the anion employed is immaterial as long as they are therapeutically acceptable. The compounds are high melting point solids having moderately strong orange to orange-red colors. They are substantially insoluble in water and tend to be sparingly soluble in cold lower-alcohols. They can usually be recrystallized from methanol.

The preferred compounds of the above indicated formula are those where R is an alkyl group of 2 to 4 carbon atoms and R' is an alkyl group of 2 to 3 carbon atoms.

Thus in one aspect the present invention provides the compounds of Formula I.

The compounds can be prepared by the condensation of a pyrrole aldehyde of Formula II

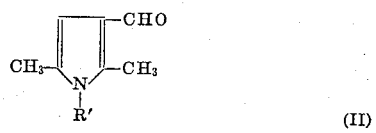

(II)

with a 2,6-lutidine quaternary salt of Formula III

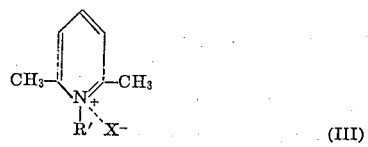

(III)

in the presence of a basic catalyst. The catalyst is conveniently piperidine but other bases of comparable basicity, such as pyrrolidine, are also effective. The anion X⁻ is conveniently that formed in the quaternization of the lutidine, for example iodide, bromide, methylsulphate, or p-toluenesulphonate. The quaternization of the lutidine is inconveniently slow with alkyl chlorides but the quaternary chlorides may be formed from the iodides by conventional procedures. The aldehyde intermediates of Formula II are conveniently prepared from N—R'—2,5-dimethylpyrroles by the action of phosphoryl chloride and dimethylformamide.

Thus, in another aspect, the present invention provides the above described synthesis of the compounds of Formula I and the intermediates of Formula II.

The compounds of Formula I have activity against whipworms. Usually whipworms are highly resistant to chemotherapy and with the known drugs multiple dosing or large doses are needed and the worm clearance is not always particularly high. However, the present compounds have high activity when used in single low doses against whipworms such as *Trichuris vulpis* in the dog. In general, the most active compounds of Formula I are those in which R is an alkyl group of 2 to 4 carbon atoms and R' is methyl, n-propyl, or iso-propyl. These compounds have eliminated whipworms from most of the dogs treated with them when they have been administered in single doses of 15 to 25 mg./kg. with very few toxic symptoms. The compounds are tasteless and emetic activity is slight; doses of nearly 2 g./kg. can be tolerated by rats so that the margin of safety is high when using doses of 15–25 mg./kg. in dogs and cats.

Some of the compounds of Formula I are also active against other parasitic nematode worms. For example, several of the compounds are active against *Nematospiroides dubius* and *Aspiculuris tetraptera* in the mouse, some against *Strongyloides ratti* in the mouse and some against the mouse pinworm *Syphacia obvelata* and the dog ascaris *Toxocara canis*.

Thus, in another aspect, the present invention provides a method of treating nematode infestations which comprises the administration of a compound of Formula I to the host. In particular, it provides a method of treating infestations of whipworm.

The compounds may be presented in any of the standard pharmaceutical formulations for oral use such as powders, granules, tablets, or suspensions which may contain other carriers and excipients such as coloring and flavoring agents, surface active agents, lubricants, bulking agents or any of the other standard pharmaceutical ingredients. These formulations can be prepared by standard methods well known in the art of pharmacy.

Thus, in yet a further aspect, the invention provides pharmaceutical formulations containing a compound of Formula I and a method for preparing such formulations.

The invention will now be described with particular reference to the following examples in which all temperatures are degree Celsius.

EXAMPLE 1

Preparation of 1-ethyl-2,5-dimethylpyrrole-3-aldehyde 40 ml. of phosphoryl chloride were added cautiously and with stirring to 130 ml. of dimethylformamide cooled in an ice bath. The mixture was cooled further and 50 g. of 1-ethyl-2,5-dimethylpyrrole were added gradually. The mixture was then heated for two hours at 100° on a steam bath. The reaction mixture was cooled, poured onto ice, and basified to pH 11 with sodium hydroxide solution.

The aldehyde crystallized and was filtered off and recrystallized from methanol. It then had a melting point of 89–90°. The yield was nearly quantitative.

EXAMPLE 2

Preparation of 1-propyl-2,5-dimethylpyrrole-3-aldehyde

By the method of Example 1, 32 ml. of dimethylformamide, 15.4 g. of phosphoryl chloride, and 14 g. of 1-propyl-2,5-dimethylpyrrole were reacted to give 16 g. of 1-propyl-2,5-dimethylpyrrole-3-aldehyde. This was distilled at 19 mm./Hg pressure, boiling point 184–186° and gave 14 g. of distillate. The material solidified after distillation and was found to melt at 55–56°.

The properties of other aldehydes so prepared are shown in Table I.

TABLE I.—PROPERTIES OF ALDEHYDES

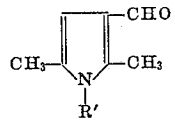

| Example No. | R' | Yield, Percent | M.P., °C. | B.P., °C. (mm.) | Crystallizing Solvent |
|---|---|---|---|---|---|
| 3 | $CH_3$ | 80–90 | 99–100 | | Ethanol. |
| 4 | $C_2H_5$ | 100 | 89–90 | | Methanol. |
| 5 | $n-C_3H_7$ | 90+ | 55–56 | 174–6 (19 mm.) | Ether, Hexane. |
| 6 | $iso-C_3H_7$ | 80+ | 62–64 | | Hexane. |
| 7 | $n-C_4H_9$ | 90 | | 182–3 (18 mm.) | |
| 8 | $n-C_5H_{11}$ | 85– | 50–51 | | Hexane. |
| 9 | $n-C_6H_{13}$ | 85± | <40 | | Do. |
| 10 | $C_6H_5CH_2CH_2$ | 80–90 | 58–9 | | Ether, Hexane. |
| 11 | $(CH_3)_2NCH_2CH_2$ | 75 | 46–8 | 191–4 (19 mm.) | Do. |
| 12 | $C_6H_5$ | 90+ | 90–91 | | Ethanol. |
| 13 | $p-ClC_6H_4$ | 95± | 123–4 | | Methanol. |

EXAMPLE 14

1-ethyl-2,6-bis (β-(1'-ethyl-2',5'-dimethyl-3'-pyrryl) vinyl)pyridinium iodide

A mixture containing 5.3 g. (0.02 M) of 2,6-lutidine ethiodide, 7.5 g. (0.05 M) of 1-ethyl-2,5-dimethylpyrrole-3-carboxaldehyde, 40 ml. of methanol, and 4 ml. of piperidine was refluxed for 24 hours. Upon cooling, 11 g. (100% yield) of orange-red crystals separated. After recrystallization from hot methanol these melted at 246–248° C. (with decomposition).

EXAMPLE 15

1-propyl-2,6-bis (β-(1'-propyl-2',5'-dimethyl-3'-pyrryl vinyl)pyridinium iodide

Under similar reaction conditions using 2,6-lutidine-n-propiodide and 1-n-propyl-2,5-dimethylpyrrole-3-aldehyde the above named product was obtained in 90% yield. After purification by crystallization from methanol, the product melted at 261–262° (with decomposition).

The properties of other quaternary salts of Formula I are shown in Table II.

TABLE II.—PROPERTIES OF QUATERNARY SALTS OF FORMULA

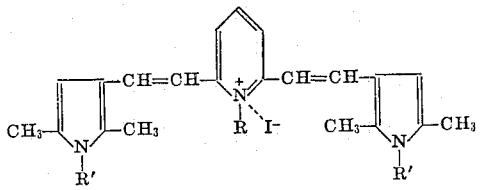

| Ex. | R' | R | Yield, Percent | Crystallizing Solvent | M.P., °C. |
|---|---|---|---|---|---|
| 16 | $CH_3$ | $CH_3$ | 85 | MeOH (insol.) | 288–90 |
| 17 | $CH_3$ | $C_2H_5$ | 90 | MeOH | 280–82 |
| 18 | $CH_3$ | $n-C_3H_7$ | 60–70 | MeOH | 277–9 |
| 19 | $CH_3$ | $n-C_4H_9$ | 90± | MeOH | 268–9 |
| 20 | $CH_3$ | $C_6H_5CH_2$ | 70 | MeOH (insol.) | 235–7 |
| 21 | $C_2H_5$ | $CH_3$ | 100 | MeOH (insol.) | 244–6 |
| 22 | $C_2H_5$ | $C_2H_5$ | 100 | MeOH (insol.) | 246–8 |
| 23 | $C_2H_5$ | $n-C_3H_7$ | 90 | MeOH | 268–9 |
| 24 | $C_2H_5$ | $n-C_4H_9$ | 95 | MeOH | 257–8 |
| 25 | $n-C_3H_7$ | $CH_3$ | 100 | MeOH | 240–1 |
| 26 | $n-C_3H_7$ | $C_2H_5$ | 100 | MeOH | 247–9 |
| 27 | $n-C_3H_7$ | $n-C_3H_7$ | 90 | MeOH | 261–2 |
| 28 | $n-C_3H_7$ | $n-C_4H_9$ | 80–90 | MeOH | 234–6 |
| 29 | $iso-C_3H_7$ | $CH_3$ | 80–90 | MeOH | 193–5 |
| 30 | $iso-C_3H_7$ | $C_2H_5$ | 80–90 | MeOH | 207–210 |
| 31 | $iso-C_3H_7$ | $n-C_3H_7$ | 95–100 | MeOH ($Et_2O$) | 237–9 |
| 32 | $iso-C_3H_7$ | $n-C_4H_9$ | 95–100 | MeOH ($Et_2O$) | 242–4 |
| 33 | $n-C_4H_9$ | $CH_3$ | 90+ | MeOH | 248–9 |
| 34 | $n-C_5H_{11}$ | $CH_3$ | 60–70 | MeOH | 231–2 |
| 35 | $n-C_5H_{11}$ | $C_2H_5$ | 95 | MeOH | 230–1 |
| 36 | $n-C_6H_{13}$ | $CH_3$ | 95+ | MeOH | 233–4 |
| 37 | $n-C_6H_{13}$ | $C_2H_5$ | 90± | MeOH | 217–18 |
| 38 | $C_6H_5-CH_2CH_2$ | $CH_3$ | 70–80 | MeOH (insol.) | 226–8 |
| 39 | $Me_2N-CH_2CH_2$ | $CH_3$ | 100 | MeOH ($Et_2O$) | 259–61 |
| 40 | $Me_2N-CH_2CH_2$ | $C_2H_5$ | 100± | MeOH ($Et_2O$) | 257–9 |
| 41 | $C_6H_5$ | $CH_3$ | 90+ | MeOH (insol.) | 271–2 |
| 42 | $p-ClC_6H_4$ | $CH_3$ | 100 | MeOH (insol.) | 265–7 |

What we claim is:

1. 1-ethyl-2,6-bis (β-(1'-ethyl-2',5'-dimethyl-3'-pyrryl) vinyl) pyridinium iodide.

2. 1 - ethyl - 2,6-bis (β-(1'-n-propyl-2',5'-dimethyl-3'-pyrryl)vinyl) pyridinium iodide.

3. A compound of the formula

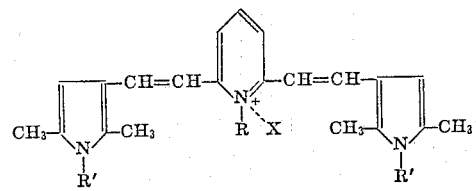

wherein R is selected from the class consisting of lower alkyl and benzyl and wherein R' is selected from the class consisting of alkyl having from 1 to 10 carbon atoms, phenethyl, phenyl, parachlorophenyl and (CH$_3$)$_2$NCH$_2$CH$_2$ and wherein X is a therapeutically acceptable anion.

4. A compound according to claim 3, in which X is an anion selected from the class consisting of halide, alkylsulphate and tosylate.

5. A compound according to claim 3, in which R is lower alkyl having 2 to 4 carbon atoms and R' is lower alkyl having 2 to 3 carbon atoms.

6. A compound according to claim 3, in which R is ethyl and R' is ethyl.

7. A compound according to claim 3, in which R is ethyl and R' is propyl.

References Cited

UNITED STATES PATENTS 2,515,905   7/1950   Sprague _____ 260—240

OTHER REFERENCES

Castle et al., J. Org. Chem., vol. 24, pages 1190–1 (1959).

Brooker et al., J. Am. Chem Soc., vol. 67, pages 1871 and 1880 (1945).

Phillips et al., Nature, vol. 204, page 892 (1964).

JOHN D. RANDOLPH, *Primary Examiner.*